(12) United States Patent
Pungetti et al.

(10) Patent No.: US 10,486,175 B2
(45) Date of Patent: Nov. 26, 2019

(54) ROTATING JOINT AND PAINTING MACHINE

(71) Applicant: CEFLA SOCIETA' COOPERATIVA, Imola (IT)

(72) Inventors: Cristian Pungetti, Ozzano dell'Emilia (IT); Stefano Chiarini, Conselice (IT)

(73) Assignee: Cefla Societa' Cooperativa (IT)

( * ) Notice: Subject to any disclaimer, the term of this patent is extended or adjusted under 35 U.S.C. 154(b) by 171 days.

(21) Appl. No.: 15/670,083

(22) Filed: Aug. 7, 2017

(65) Prior Publication Data

US 2018/0036753 A1 Feb. 8, 2018

(30) Foreign Application Priority Data

Aug. 5, 2016 (IT) .................. 102016000082936

(51) Int. Cl.
| | |
|---|---|
| *B05B 7/08* | (2006.01) |
| *F16L 39/06* | (2006.01) |
| *B05B 12/00* | (2018.01) |
| *B05B 13/04* | (2006.01) |
| *B05B 15/65* | (2018.01) |

(52) U.S. Cl.
CPC .......... *B05B 7/0846* (2013.01); *B05B 12/004* (2013.01); *B05B 13/0484* (2013.01); *B05B 15/65* (2018.02); *F16L 39/06* (2013.01)

(58) Field of Classification Search
CPC ............ B05B 13/0484; B05B 13/0421; B05B 12/004; B05B 12/002; B05B 3/02; B05B 7/0846; B05B 7/04; B05B 15/65; B05B 15/658; F16L 39/06
USPC ........................................ 239/112; 118/680
See application file for complete search history.

(56) References Cited

U.S. PATENT DOCUMENTS

| | | | | |
|---|---|---|---|---|
| 3,426,973 | A * | 2/1969 | Ordway | .............. B05B 13/0484 |
| | | | | 118/323 |
| 2008/0061514 | A1* | 3/2008 | Suzuki | ................. F16J 15/3484 |
| | | | | 277/375 |

FOREIGN PATENT DOCUMENTS

| | | |
|---|---|---|
| CN | 202791073 U | 3/2013 |
| EP | 2189544 A1 | 5/2010 |
| IT | VE20110060 A1 | 2/2013 |

(Continued)

*Primary Examiner* — Arthur O. Hall
*Assistant Examiner* — Tuongminh N Pham
(74) *Attorney, Agent, or Firm* — Laubscher & Laubscher, P.C.

(57) ABSTRACT

A paint spraying machine includes an apparatus for containing and removing the leakage of paint drops from a rotating joint, without the risk of damaging the article being sprayed, and thus without the need for downtime to replace sealing elements. The rotating joint includes a hollow shaft for distributing paint, a drum including a plurality of flanges that define separate chambers for different paints, a plurality of seals for separating the different paints in the different chambers which together form a high-pressure circuit, a low-pressure circuit to refrigerate the seals, improve their sealing and possibly intercept leaking paint, and a plurality of centering rings provide for correct assembly of the seals and the correct alignment of different flanges. The rings are hollow, and allow for the passage of the refrigerating/cleaning liquid under low pressure. A method for operating the machine includes containing and removing the leakage of paint drops from a rotating joint and distributing them back to the supplying tank of the refrigerating/cleaning liquid.

19 Claims, 9 Drawing Sheets

(56) References Cited

FOREIGN PATENT DOCUMENTS

IT        VR20130101 A1    10/2014
WO      9317182 A1    2/1993

\* cited by examiner

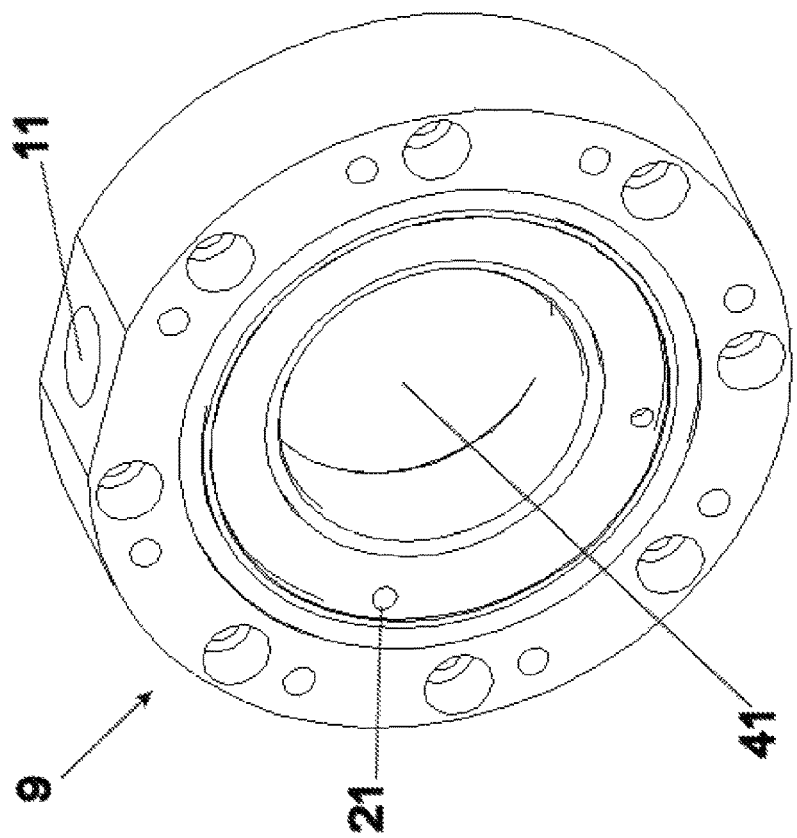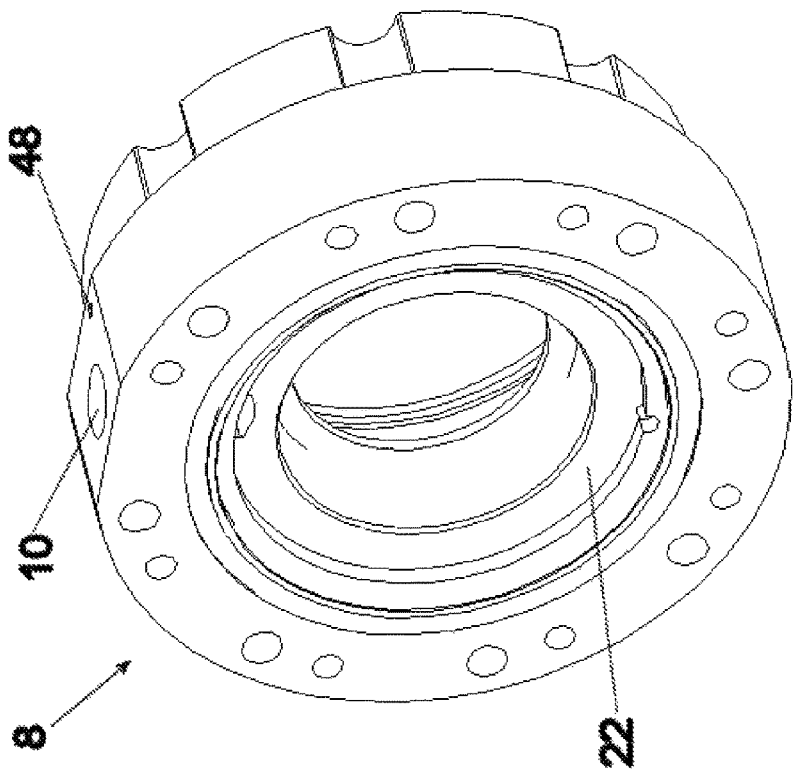
FIG. 9
FIG. 8

ROTATING JOINT AND PAINTING MACHINE

The present invention relates to the technical field of machines for painting articles wherein spraying guns are fixed to a rotating carrier. In particular, it relates to a rotating joint for supplying paint to a spraying gun.

Background of the Invention

Machines for spraying paint are known in the art, which belong essentially to two types:
- oscillating spraying machines, wherein spraying guns are fixed on arms which oscillate with respect to the article to be painted; and
- circular rotation spraying machines, wherein spraying guns are fixed on a rotary carrier rotating above the article to be painted.

Circular rotation spraying machines allow a simpler adjustment and a better paint transfer efficiency with respect to oscillating machines.

Such machines are provided with a known rotating joint to supply paint to the machine spraying guns (typically from eight to twenty-four guns). Such a rotating joint supplies paint which often circulates inside a high-pressure circuit. A typical drawback of such machines is that high pressure leads to paint leakage, which imposes downtime from damage of in-process articles and higher costs from the replacement of the joint and the downtime.

Substantially, the rotating joints have a hollow shaft for supplying paint to one or more circuits distributing paint to spraying guns. A plurality of circuits prevents downtime that is caused by the change of paint. There are typically provided at least two tanks which provide two distinct paints to distinct spraying guns. Consequently, painting processes can be performed employing different paints or different colors, withdrawing the different products in succession from their different tanks, without the need to stop the machine to change paint or color in the tank.

An element that distributes paint to the spraying guns is connected to the hollow shaft which is provided with different entrance and discharge openings. Every discharge opening is connected to a chamber. The plurality of chambers forms the external drum, which is stationary with respect to the hollow shaft pivoting inside of it. In the different chambers, different paints are contained. Between two chambers, there is provided a plurality of sealing elements, which are integral to the external drum and which scrape on the surfaces of the pivoting hollow shaft. These sealing elements assure separation of paints.

The paints in use circulate in a circuit under high pressure. Moreover, they are often chemically corrosive, and sometimes are viscous. During operation of the painting machine, friction is generated between the sealing elements and the contact surface of the shaft, which in turn generates high temperatures. All together, these factors are strongly critical for the sealing of chambers, and lead to paint leakage over time which causes downtime for rotating joint maintenance.

Recirculating paint is known in the art. Paint, through a pump and a pipe, is distributed to a plurality of spraying guns. From the guns a second pipe distributes paint back to its tank to always keep paint moving inside pipes, and to recover non-sprayed paint. The paint has to constantly move inside the pipes because some kinds of paint clog or create sediment if not moved.

A rotating hydraulic joint for distributing oil is described in CN202791073; Although similar to the present invention, such a joint could not be used in the painting field.

SUMMARY OF THE INVENTION

The aim of the present invention is to provide an apparatus and a method for containing and removing the leakage of paint drops from the rotating joints, without the risk of damaging the in-process article, and therefore without the need for downtime to replace sealing elements.

Accordingly, it is an object of the present invention to provide a paint spraying machine that includes an apparatus for containing and removing the leakage of paint drops from a rotating joint, without the risk of damaging the article being sprayed, and thus without the need for downtime to replace sealing elements. The rotating joint includes a hollow shaft for distributing paint, a drum including a plurality of flanges that define separate chambers for different paints, an a plurality of seals for separating the different paints in the different chambers which together form a high-pressure circuit. The machine also includes a low-pressure circuit that refrigerates the seals to improve their sealing and possibly intercept leaking paint, and a plurality of centering rings which provide for correct assembly of the seals and the correct alignment of different flanges. The rings are hollow and allow for the passage of the refrigerating/cleaning liquid under low pressure.

In one embodiment, the rotating joint includes two end flanges and a single intermediate flange, for use of one paint. In another embodiment, the rotating joint includes two end flanges and two intermediate flanges, for use with one paint with recirculation. In a further embodiment, the rotating joint includes two end flanges and any number of intermediate flanges, for use of an equivalent number of paints. In yet another embodiment, the rotating joint includes two end joints and an even number of intermediate flanges, for use of an equivalent number of paints with recirculation.

It is another object of the present invention to provide a method for operating a paint machine while containing and removing the leakage of paint drops from a rotating joint of a paint spraying machine. The method steps include supplying at least one paint, in particular from its tank, to the rotating joint, and distributing the paint to spraying guns, wherein the paints circulate inside a high-pressure circuit, and wherein the paint may be recirculated. A refrigerating/cleaning liquid is circulated inside a low-pressure circuit surrounding the high-pressure circuit, refrigerating the rotating joint, intercepting the possible leaking drops of paint, and distributing them back to the supplying tank of the refrigerating/cleaning liquid.

According to a preferred method, the cloudiness of the refrigerating/cleaning liquid that is due to the incorporation of paint is evaluated in order to determine if maintenance/cleaning of the rotating joint is needed.

The refrigerating/cleaning liquid varies according to the used paints. It can be water, but also an organic solvent such as acetone.

A first advantage of the present invention is that a painting process that is free from paint leakage is provided.

A second advantage is limiting downtime due to paint leakage.

A third advantage is the possibility of programming maintenance interventions, according to the evaluation of the degree of cloudiness of the liquid circulating in the low-pressure refrigerating circuit.

A fourth advantage is the fact that the shape of the joint assures an easy assembly of all its parts, and particularly of the seals of the high-pressure and low-pressure circuits. Moreover, cleaning and maintenance needed to refurbish the joint components is easier.

Further advantages and properties of the present invention are disclosed in the following description, in which exemplary embodiments of the present invention are explained in detail on the basis of the drawings:

BRIEF DESCRIPTION OF THE DRAWINGS

FIG. 8 is a perspective view of an end flange;

FIG. 9 is a perspective view of an intermediate flange; and

DETAILED DESCRIPTION

In a first embodiment there are provided just one tank and one high-pressure circuit for one paint only.

In another embodiment, there are provided a plurality of distinct reservoirs for supplying paint, with a corresponding plurality of distinct high-pressure circuits, In the embodiment shown in the accompanying Figures, two distinct reservoirs and two distinct high-pressure circuits are provided, wherein two distinct paints can circulate. This embodiment allows the recirculation of the paints.

Figure 1A:
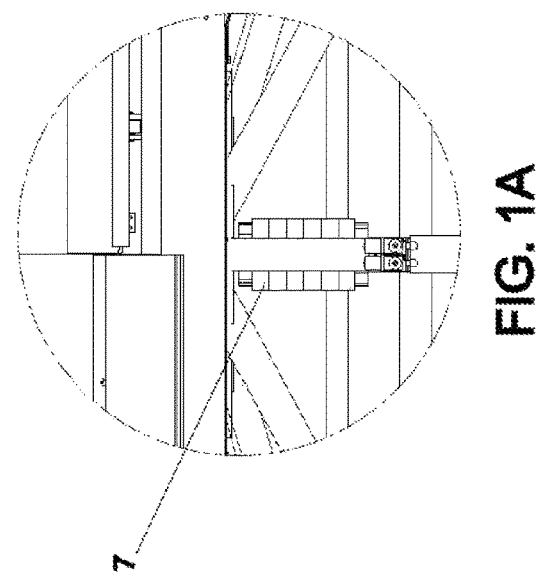
FIG. 1A is a front view of a detail of the circular rotation spraying machine showing the position of the rotating joint inside the machine.
Figure 1:
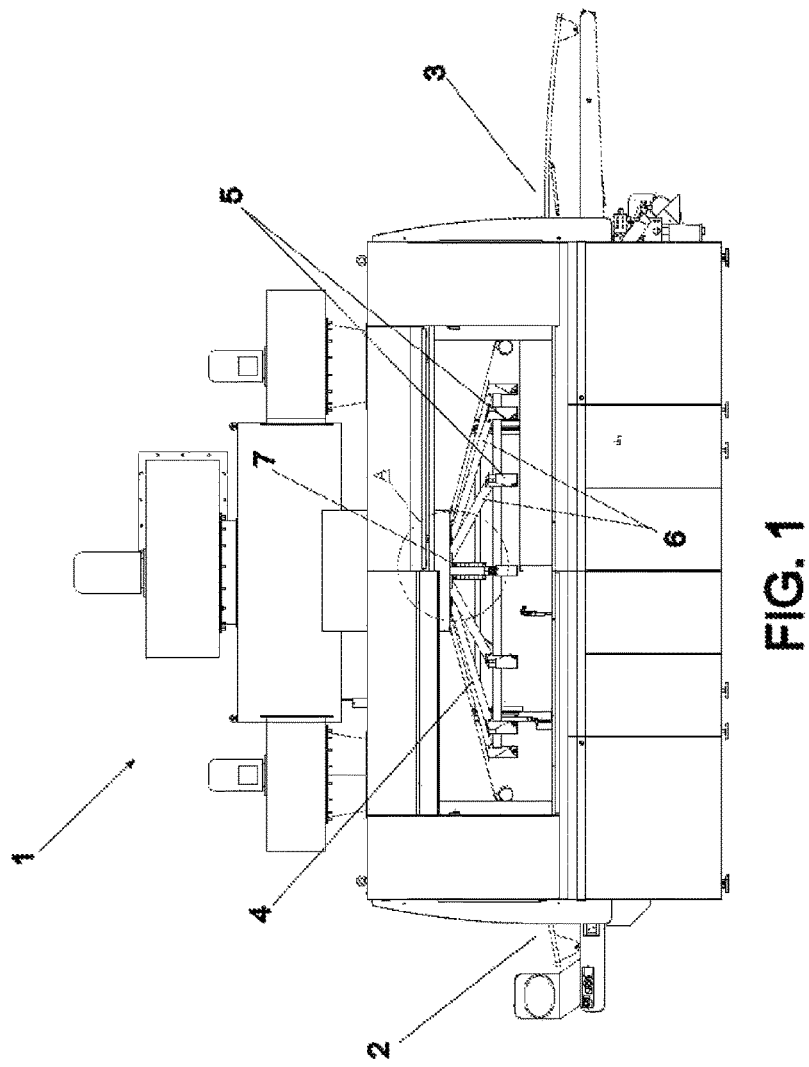
FIG. 1 is a front view of a circular rotation spraying machine.

FIG. 1 shows a circular rotation spraying machine for the paint spraying of articles (not shown), including a painting rotary carrier 4. The articles to be painted enter through an entrance 2, are conveyed on a belt conveyor (not visible in the present Figure) under the painting rotary carrier 4, and leave painted through an exit 3, The painting rotary carrier 4, fixed to a ceiling (not shown) of the machine 1, is provided with a plurality of spraying guns (not shown). The guns are positioned relative to the spokes 6 of the painting rotary carrier 4. In the embodiment of FIG. 1, there are twelve spokes of the rotary carrier. At the end of each spoke one or two spraying guns can be connected, which brings the number of guns to twenty-four.

The machine 1 includes a rotating joint 7 positioned at a center of the painting rotary carrier 4, as can be better appreciated from the magnified detail of FIG. 1A.

Figure 2:
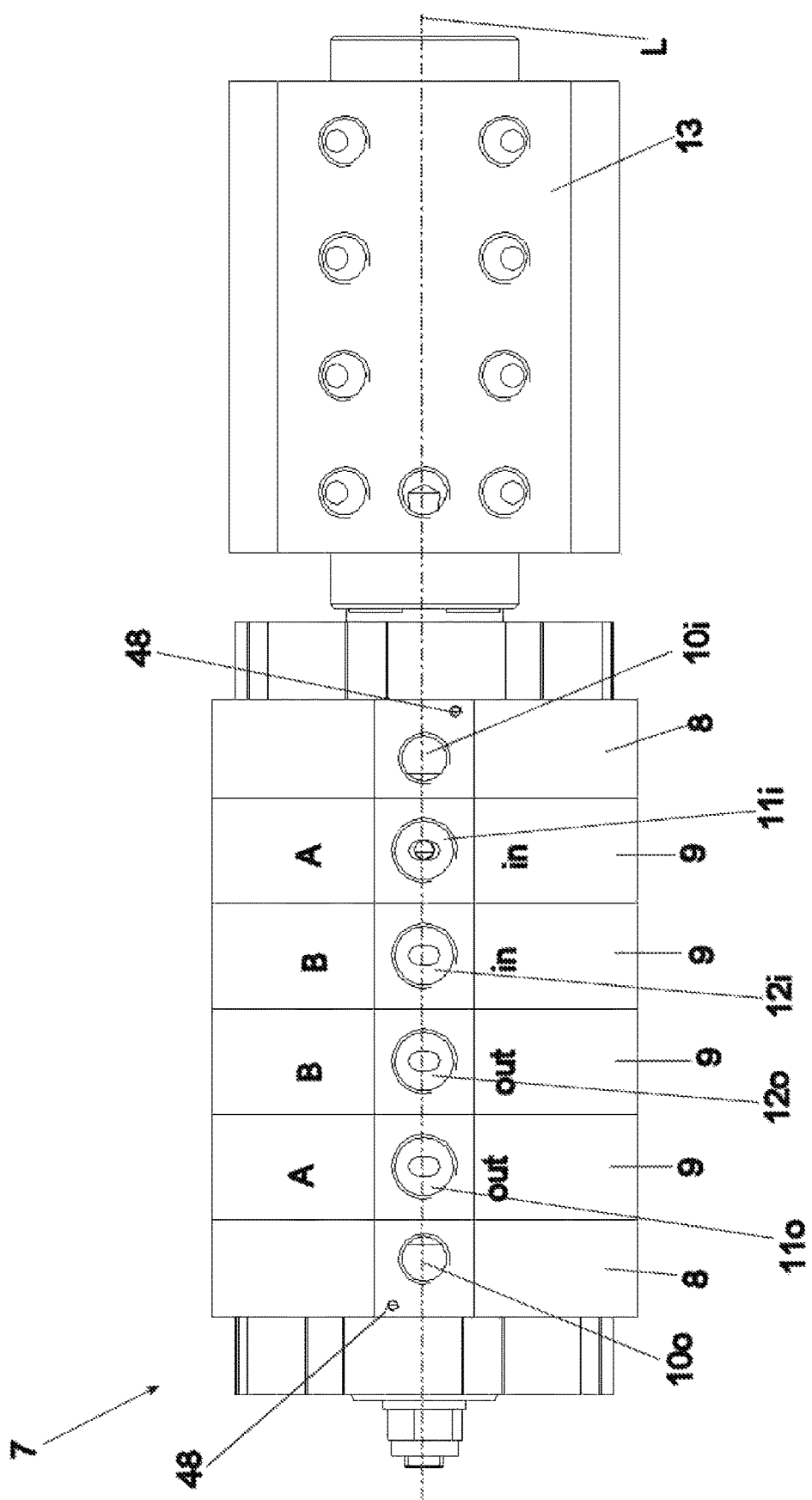
FIG. 2 is a front view of the joint.

FIG. 2 is an external view of the rotary joint 7. The joint 7 rotates with a hollow shaft 14 (shown in FIGS. 3 and 4) and a distributing block 13 around an axis L, which is also the rotating axis of the painting rotary carrier 4.

The block 13 is in communication with the spraying guns through suitable pipes (not shown), and distributes different paints to different guns.

Figure 3:
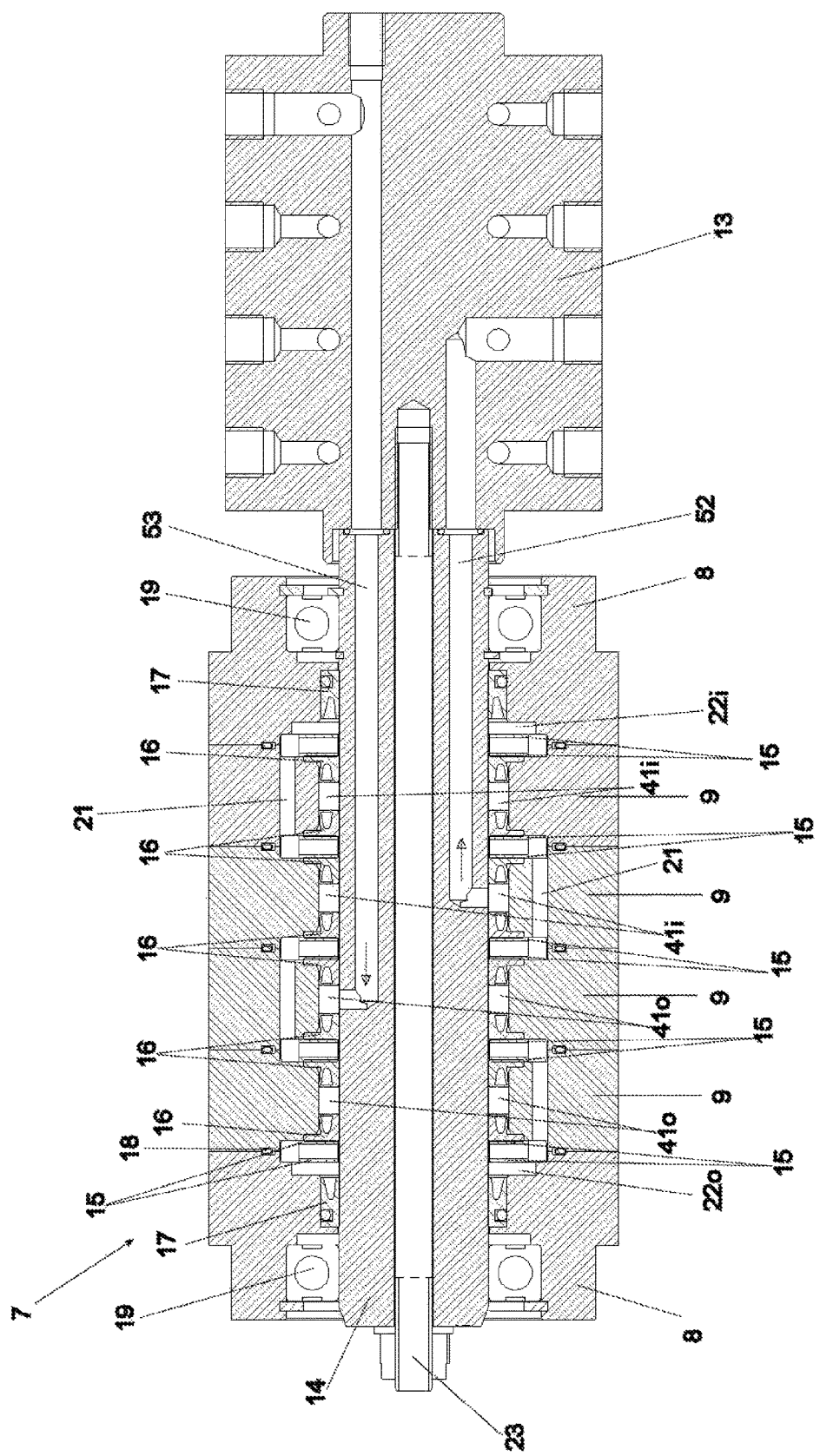
FIG. 3 is a longitudinal section of the joint.
Figure 4:
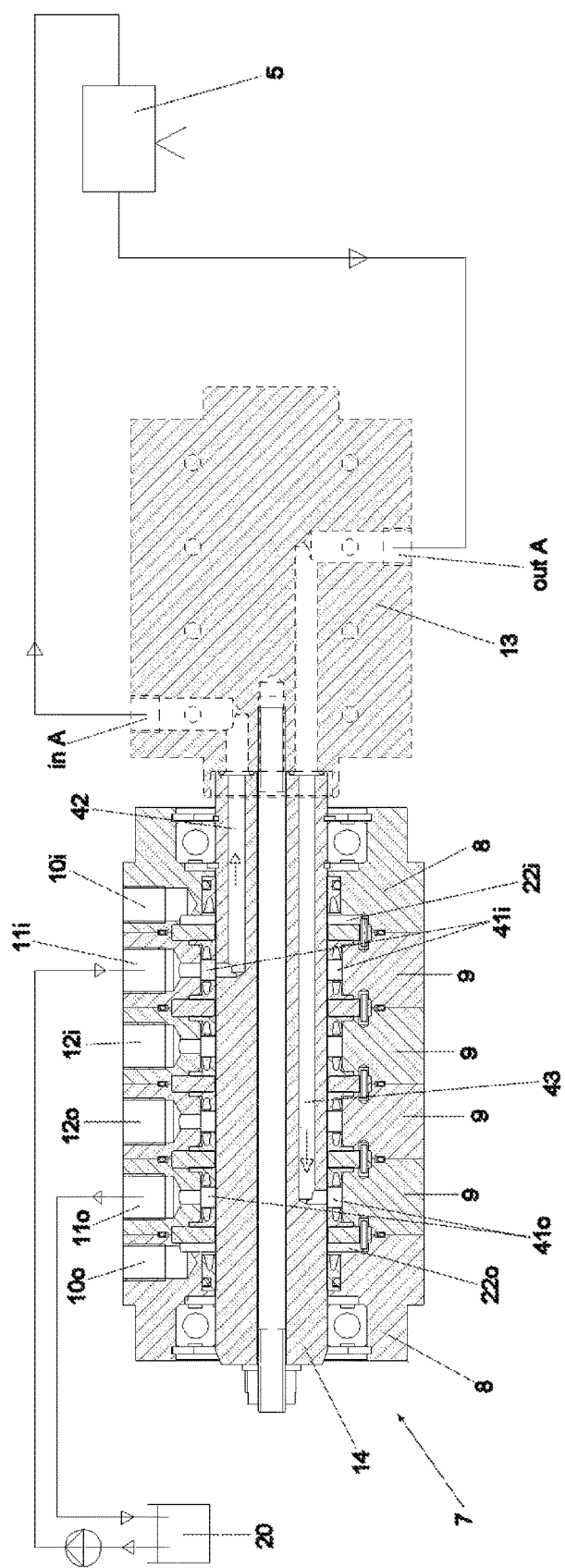
FIG. 4 is a longitudinal section of the joint, orthogonal to the section of FIG. 3.

FIGS. 3 and 4 are two longitudinal sections of the same rotating joint 7 according to two orthogonal planes, both passing through the axis L of the joint 7 visible in FIG. 2.

FIG. 4 shows a first high-pressure circuit for supplying a first paint A, while FIG. 3 shows a second high-pressure circuit for supplying a second paint B. FIG. 4 shows the joint 7 which allows for the entrance and the discharge of paints and of refrigerating/cleaning liquid.

FIG. 3 shows a connection element 23, such as a threaded bolt, between the joint 7 and distributing block 13.

Normally high-pressure circuits do not have moving parts. In this case, the rotary movement of guns and relative parts is connected with the circuit, which is stationary with respect to the machine and to supplying reservoirs. The rotating joint 7 is the element of the high-pressure circuit that determines the relative movement between the two parts of the high-pressure circuit, and allows the paint to be distributed to a rotating article.

The joint 7 includes a block 13 and a shaft 14, which are the rotating elements of the joint, A plurality of flanges 8 and 9, rings 15 and seals 16, 17, and 18 remain stationary with respect to the machine, The relative movement among the components is one of the elements determining the criticality of the rotating joint 7.

There are two end flanges 8 in the joint 7. There are a variable number of intermediate flanges 9, as will be better explained below. The embodiment illustrated in FIG. 2 includes four intermediate flanges 9, forming part of two distinct high-pressure circuits, a first circuit and a second circuit for distributing to at least a first spraying gun and at least a second spraying gun two distinct paints A and B, with recirculation of the paint.

Referring to FIGS. 3 and 4, each flange 9 includes an annular chamber which serves as a hollow entrance ring 41$i$ or discharge ring 41$o$. Each ring is in communication with a respective duct 42 or 52 suitable for receiving the respective paint A or B. The chamber, when supplied from the tank 20 (shown in FIG. 4), fills up with paint under high-pressure. The paint is maintained in the annular chamber 41$i$ or 41$o$ by seals 16 (shown in FIG. 3). Each flange 9 is connected to its respective tank 20 in order to receive paint to be distributed to spray guns, or to receive paint not used by guns to distribute it to the tank 20. Therefore, for each paint, each flange 9 can be an entrance flange or a discharge flange.

In the case of a first high-pressure paint A and a second high-pressure paint B, the machine 1 includes two respective supplying tanks 20 to supply guns.The tank 20 for paint B is not shown in the drawings. The rotating joint 7 is not enough to keep the paint moving in the high-pressure circuit, and thus the paint has to be distributed back to its respective supplying tank 20 (as shown in FIG. 4). Consequently, in the rotating joint 7 there is an entrance of the paint (in A), which brings the paint from the tank to a spray gun, and a discharge (out A) which brings the unused paint from the spray gun to the supplying tank In FIGS. 2 and 4, for the first paint A an opening 11$i$ is the entrance, and an opening 11$o$ is the discharge. For a second paint B, an opening 12$i$ is used as the entrance, and an opening indicated with 12$o$ is the discharge. The four intermediate flanges 9 are provided with openings 11$i$, 11$o$, 12$i$, 12$o$.

Moreover, there is an entrance opening 10$i$ and discharge opening 10$o$ in the end flanges 8 for the low-pressure refrigerating/cleaning liquid.

The first circuit of the high-pressure paints includes a first duct 42 housed in the hollow shaft 14. The first paint A, which is contained in a first respective tank 20, is supplied from the tank 20 to the joint 7 through the entrance 11i, and supplies a first spraying gun with paint through the first duct 42 and distribution block 13. When recirculation of unused paint is necessary, the first circuit includes a second duct 43 of the first paint A. From the spraying gun, the first paint A passes through the block 13, through the second duct 43 and its respective annular chamber, out from opening 11o and to the first tank 20, as shown in FIG. 4. The same goes for the second paint B, which enters from entrance 12i and exits from discharge 12o crossing a first supplying duct 52 and a second recirculating duct 53, which are both in the hollow shaft 14.

Figure 6:
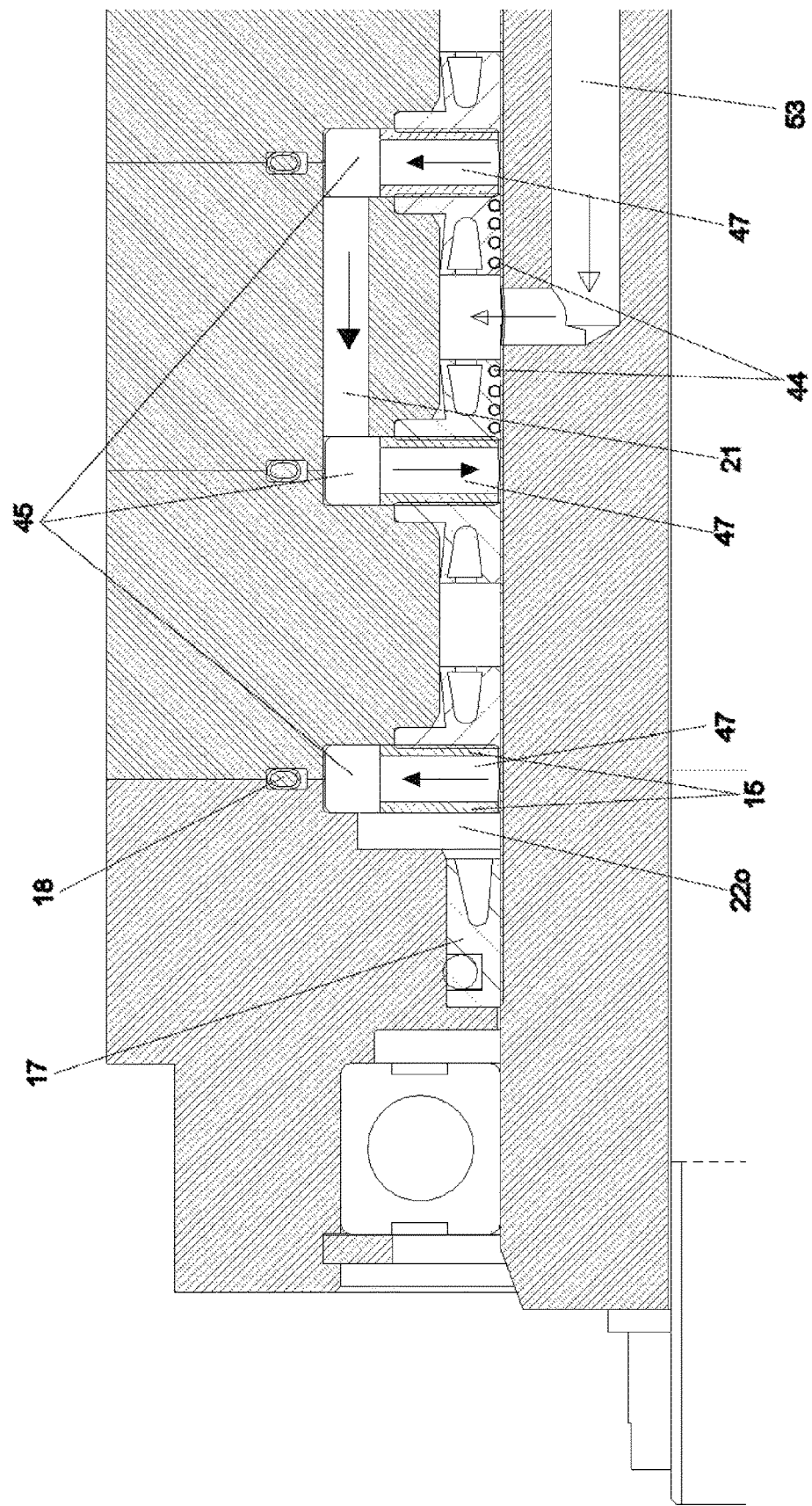
FIG. 6 is a magnified detail of FIG. 3, at the end opposite to the distribution block.

Concerning the low-pressure circuit of the refrigerating/cleaning liquid, the liquid is withdrawn from a tank(not shown), distributed to the entrance opening 10i and distributed back to the same tank through the discharge opening 10o as shown in FIGS. 4 and 6.

In particular, the refrigerating/cleaning liquid is withdrawn from a tank (not shown) and through a pipe (not shown). It enters an entrance opening 10i inside the rotating joint 7, and circulates in a low-pressure circuit including a first cavity 45 (FIG. 6), an entrance gap 22i, a first connecting hole 21, a second cavity 45, a hole 47, a second cavity 45, a second connection hole 21 and a second gap 22o, to distribute refrigerating/cleaning liquid from the entrance opening 10i of the first end flange 8 to the discharge opening 10o of the second end flange.

A first annular chamber 41 of the high-pressure circuit is interposed between the first gap 22i and the second gap 22o along the axis and is placed more internally than the connection hole 21 with respect to the axis L. In this way, the low-pressure circuit of the refrigerating/cleaning liquid, completely surrounds the first annular chamber 41 and can intercept undesired possible leakage of the first paint A.

Figure 5:
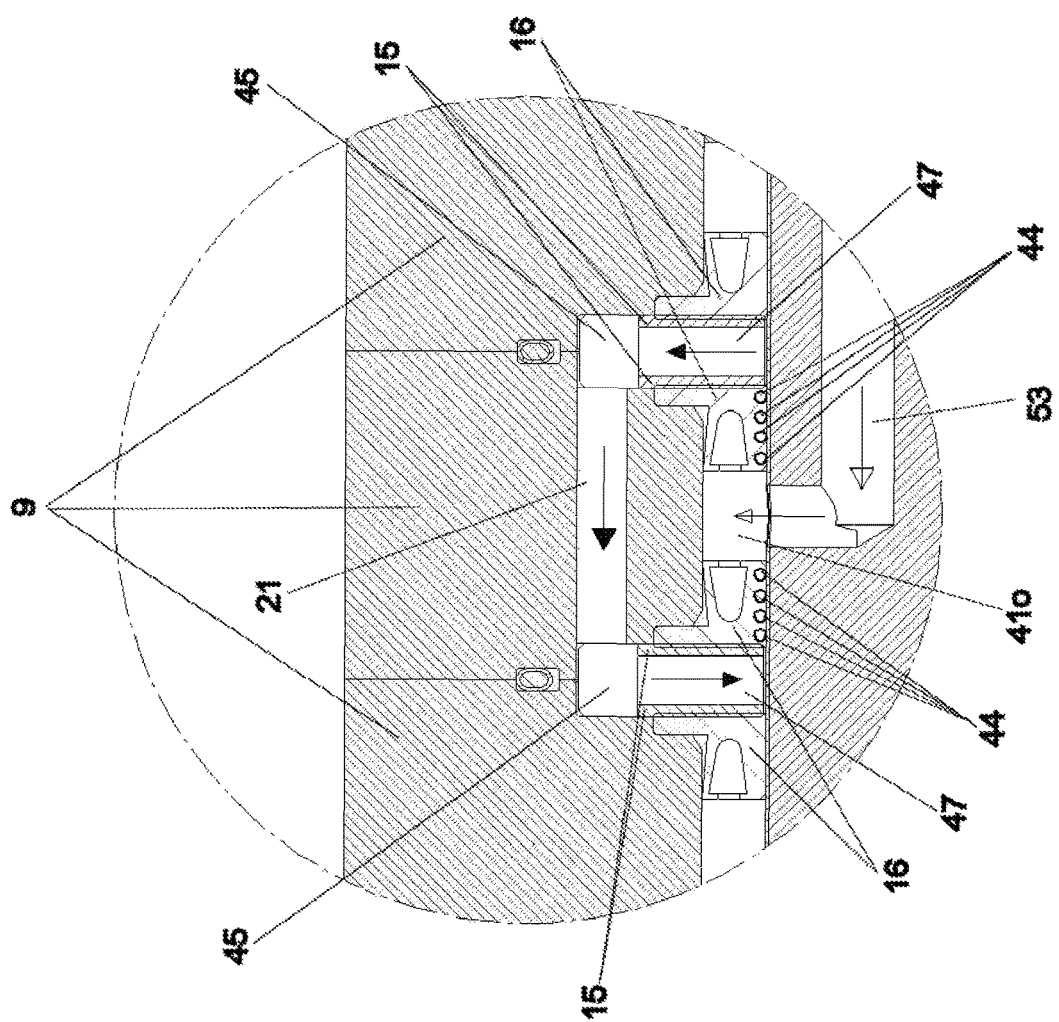
FIG. 5 is a magnified detail of a central portion of FIG. 3.

The path of the refrigerating/cleaning liquid between the entrance opening 10i and the discharge opening 10o is better visible in FIG. 3 and in the details shown in FIGS. 5 and 6. The refrigerating/cleaning liquid (illustrated with black arrows) crosses the centering hollow rings 5 and the flanges 9 through the holes 21 obtained in the intermediate flanges 9, and the gaps 22i and 22o obtained in the end flanges 8. In this way, the liquid crosses all the flanges and all the rings to refrigerate the joint, and more specifically the high-pressure sealing elements.

The refrigerating/cleaning liquid intercepts possible leakages 44 from the seals of the high-pressure circuit. The low-pressure circuit completely surrounds the high-pressure circuit, and is contained inside the joint through the seals 17 and 18.

In FIG. 3 the duct 52 is visible, distributing paint B from the flange 9 to the block 13, and the duct 53, bringing back paint B from the block 13 to the flange 9. In FIG. 4 the duct 42 is visible, distributing paint A from the flange 9 to the block 13, and the duct 42 distributing back paint A from the block 13 to the flange 9.

FIG. 5 illustrates a magnified portion of FIG. 3 in order to highlight the areas where the high-pressure paint (illustrated with white arrows) and the refrigerating/cleaning liquid (illustrated with black arrows) are. The white arrows show the path of the high-pressure paint B.

In FIG. 5, the hollow centering ring 15 is shown in a longitudinal section, wherein the passage sections are highlighted, in particular the cavities 45 and holes 47. The ring 15 is hollowed out to form a cavity 45 and pierced to form a hole 47, to allow the passage of the refrigerating/cleaning liquid.

In FIG. 5 the possible leakage of high-pressure paint is shown in the form of drops 44. The leaked paint is intercepted by the flow of low-pressure refrigerating/cleaning liquid.

FIG. 6 illustrates a detail of FIG. 3 nearer to the end of the joint 7, with respect to the detail shown in FIG. 5, to better show the working of the low-pressure seals 17 and 18, and the path of the low-pressure refrigerating/cleaning liquid. For each flange 9, the refrigerating/cleaning liquid crosses the joint 7 via the holes 21 on flanges 9, the holes 47 on the ring 15, and the cavity 45 obtained in the ring 15. In this way, refrigerating/cleaning liquid can cross the joint 7 and connect the gaps 22i and 22o placed at the ends of the joint 7.

In the end flanges 8 of the joint 7, refrigerating/cleaning liquid fills up the hole 47, the cavity 45 and the gap 22i or 22o. Seals 17 and 18 maintain the refrigerating/cleaning liquid inside these areas.

The difference in pressure between the two circuits allows the low-pressure circuit to intercept leakages 44 and lead them toward the low-pressure circuit. Should the high-pressure circuit not be supplied with paint, leakages could reverse their direction.

Possible leakages from high-pressure seals 16 are intercepted by refrigerating/cleaning liquid, modifying the cloudiness of the liquid itself, visible by human eye observing the content of the tank of the liquid itself.

Leakages of refrigerating/cleaning liquid from low-pressure seals 18 (O-rings) are easily visible to the naked eye on the surface of the joint 7 itself. Leakages of refrigerating/cleaning liquid from the seal 17 would become visible only after the liquid crossed the bearing 19. To hasten the visibility of this leakage, holes 48 are drilled in the end flange 8 to communicate with the areas housing bearings 19. On the other hand, leakages 44 in intermediate flanges 9 are more probably intercepted by refrigerating/cleaning liquid, and are visible as cloudiness of refrigerating/cleaning liquid in the supplying tank.

The drops 44 leaked from the high-pressure circuit are intercepted by the low-pressure circuit and distributed to the tank (not shown) of refrigerating/cleaning liquid. This, over time, leads to the cloudiness of the liquid contained in the tank in a way visible by human eye, allowing to qualitatively determine the degree of containment of the paint provided by the high-pressure seals, and to plan well in advance a maintenance intervention on the machine 1, and particularly of the joint 7, which is then replaced.

Figure 7:
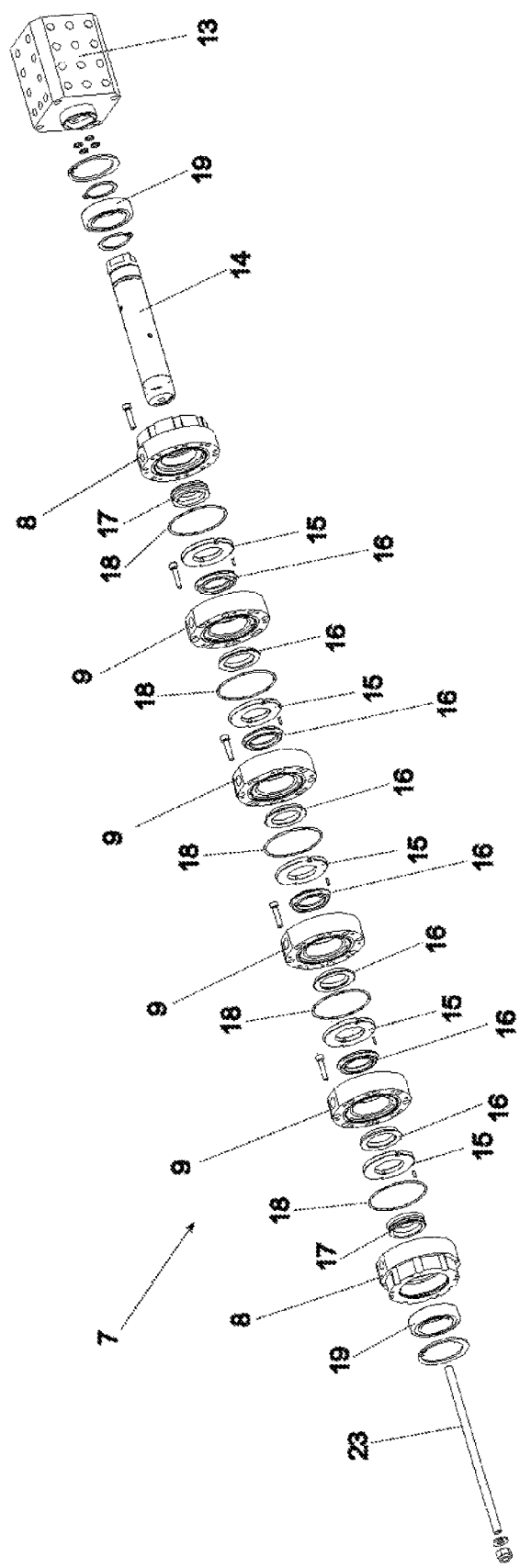
FIG. 7 is a perspective exploded view of the components of the joint.

FIG. 7 shows an exploded perspective view of the components of the rotating joint 7 described above. At one end of FIG. 7 is a connecting element 23, and at the other end is the distributing block 13.

The refrigerating/cleaning liquid enters inside the flange 8, fills up the gap 22i through the cavity 45 in the hollow centering ring 15, and diametrically crosses the ring 15 through the hole 47 obtained in the hollow ring 15, In the intermediate flange 9 a through hole 21 is provided, parallel to the axis L, leading to a second cavity 45, and then crossing the second hole 47. The hollow ring 15 is housed in a seat that is formed by hollowing out the two opposing flanges 9 on their sides.

Between an end flange 8 and an adjacent intermediate flange 9, a seat for the centering ring 15 is hollowed out from the flanges.

FIG. 7 shows the zigzag path of the refrigerating/cleaning liquid imparted by intermediate flanges 9, which are mounted one near the other flipping them by 180° with respect to the axis L, keeping the discharge openings 11 or 12 always oriented in the same direction.

The assembly of intermediate flanges 9 is foolproof for human operators, in that the assembly of flanges 9 is prevented from having through holes 21 of adjacent flanges aligned as shown in FIG. 3.

The hollow centering ring 15 allows the correct alignment of the different flanges 8 or 9, and the correct pressure on the seals 16; moreover, the presence of the cavity 45 and of the through hole 47 allows the zigzag passage of the refrigerating/cleaning liquid.

FIG. 8 shows an end flange in a perspective view, Its opening 10 and chamber 22 can be an entrance opening 10$i$ and 22$i$, respectively, or a discharge opening 10$o$ and 22$o$, respectively, of the refrigerating/cleaning liquid. The hole 48 allows for the discharge of a mixture of paint and refrigerating/cleaning liquid on the surface of the joint 7, thus indicating the need for maintenance. As shown in FIG. 7, the hollow shaft 14 is coaxial with the flange 8.

FIG. 9 shows an intermediate flange 9 in a perspective view, Its opening 11 or 12 can be an entrance opening 11$i$ or 12$i$ or a discharge opening 11$o$ or 12$o$ for paints A and B. There is a through hole 21 for the refrigerating/cleaning liquid. The chamber 41 houses the hollow shaft 14, rendering the chamber 41 as a coaxial ring. As shown in FIG. 7, the hollow shaft 14 is coaxial with the flange 9.

Figure 10:
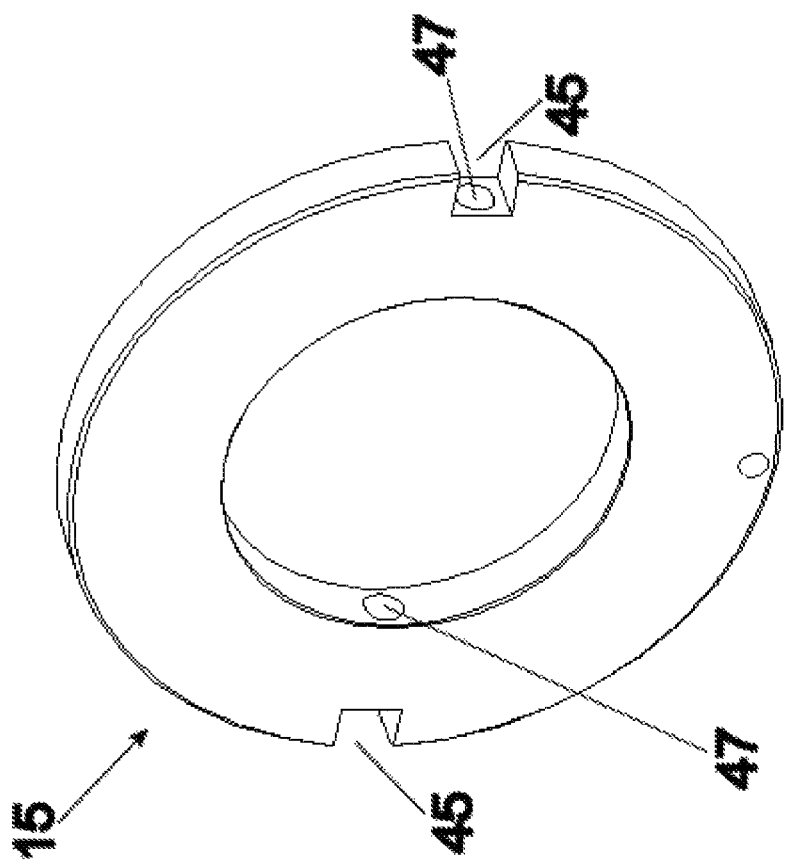
FIG. 10 is a perspective view of a hollow centring ring.

FIG. 10 shows a hollow centering ring 15, having two through holes 47 diametrically obtained in two respective cavities 45 for the passage of refrigerating/cleaning liquid.

In an alternative embodiment, the four high-pressure chambers provided by the intermediate flanges 9, instead of working as entrance and discharge chambers of two distinct paints with recirculation, can work as four entrance chambers of four distinct paint circuits without recirculation.

In yet another embodiment, the circular rotation spraying machine 1 is provided with at least two rotating joints 7. The first rotating joint 7 is dismantled from the machine 1 and replaced with a second joint 7. The first joint 7 can be inspected and refurbished for a successive reuse.

The method for the high-pressure circuit of the present invention includes the steps of, withdrawing one or more paints from respective supplying tanks 20 and distributing them to a rotating joint 7 through respective pneumatic pumps, preferably piston pumps, distributing the paints through the hollow shaft 14 of the rotating joint 7 to the rotating distribution block 13, from which paints reach spraying guns, and Spraying the paints on the articles through spraying guns. In one embodiment, the unused paint is re-distributed to the supplying tank 20 through the distribution block 13 and the hollow shaft 14.

The method for the low-pressure circuit of the present invention includes the steps of, withdrawing refrigerating/cleaning liquid from its supplying tank, and distributing it to the joint 7 through a pneumatic pump, preferably a diaphragm pump, circulating the refrigerating/cleaning liquid inside the joint 7 through the hollow rings 15 and the holes 21 in flanges 9, and gaps 22 in end flanges 8. The main function of the refrigerating/cleaning liquid is to reduce the temperature of the joint, particularly of all its elements. Should the liquid, during its path inside the joint, intercept leaked paint 44, it distributes its to the supplying tank of the refrigerating/cleaning liquid. The visible cloudiness of the refrigerating/cleaning liquid allows for planning a maintenance intervention of the rotating joint itself.

In an alternative embodiment, an automatic detection system detects the cloudiness of the refrigerating/cleaning liquid, and the cloudiness of the liquid beyond a pre-set threshold leads to the activation of a signalling system for the human operator in charge of the maintenance of the circular rotation spraying machine 1.

While the preferred forms and embodiments of the invention have been illustrated and described, it will be appreciated by those of ordinary skill in the art that various changes and modifications may be made without deviating from the inventive concepts set forth above.

The invention claimed is:

1. A rotating joint for distributing paint to at least one spraying gun, comprising:
   (a) a hollow shaft which rotates around a longitudinal axis and contains a first duct;
   (b) a high-pressure first circuit for delivering a first paint to a first spraying gun, said first circuit including said first duct for said first paint; and
   (c) a drum including
      (1) a plurality of flanges coaxial with said longitudinal axis, and arranged around said shaft in contact with each other, said flanges including at least one first intermediate flange which includes a first annular chamber in communication with said first duct and having a first opening suitable for receiving said first paint which is in communication with said first annular chamber and first and second end flanges, said first intermediate flange being interposed between said first and second end flanges, said first paint of said first high-pressure circuit being received from said first opening and being delivered to said spraying gun through said first annular chamber and said first duct, said first end flange including a respective entrance opening for a refrigerating/cleaning liquid, said second end flange including a respective discharge opening for said refrigerating/cleaning liquid, and said first intermediate flange including a respective first connecting hole parallel to said axis;
      (2) a first annular end gap, contained at least partly in said first end flange and in communication with said entrance opening of said refrigerating/cleaning liquid;
      (3) a second annular end gap contained at least partly in said second end flange which is in communication with said discharge opening of refrigerating/cleaning liquid, said first connection hole being in communication with said first gap and with said second gap; and
   (d) a low-pressure circuit for distributing said refrigerating/cleaning liquid from said entrance opening of said first end flange to said discharge opening of said second end flange through said first gap, said first connection hole and said second gap, wherein said first annular chamber of said high-pressure circuit is interposed between said first gap and said second gap along said longitudinal axis and is arranged more internally than said first connection hole with respect to said axis, said low-pressure circuit completely surrounding said annular chamber and intercepting possible undesired leakages of said first paint.

2. A rotating joint as defined in claim 1, wherein said shaft contains a second duct which forms a portion of said first high-pressure circuit to receive a first unused paint from the spraying gun.

3. A rotating joint as defined in claim 2, wherein said drum further comprises:
   (a) a second intermediate flange containing an annular chamber in communication with said second duct; and
   (b) a second discharge opening for discharging said first unused paint, said second intermediate flange and said second discharge opening being in communication with each other, said second intermediate flange being interposed between said first intermediate flange and said second end flange, and being coaxial with said axis and in contact with said first intermediate flange.

4. A rotating joint as defined in claim 3, wherein said high-pressure circuit further comprises said second annular chamber and said second duct to recirculate said first unused paint to said second opening through said second duct for said first paint.

5. A rotating joint as defined in claim 4, wherein said second intermediate flange comprises a respective second connection hole parallel to said longitudinal axis.

6. A rotating joint as defined in claim 5, wherein said first intermediate flange and said second intermediate flange define a first intermediate cavity within said drum, said first intermediate cavity being in communication with said first connection hole and with said second connection hole.

7. A rotating joint as defined in claim 6, wherein said low-pressure circuit further comprises said first intermediate cavity and said second connection hole to distribute refrigerating/cleaning liquid from said entrance opening of said first end flange to said discharge opening of said second end flange through said first gap, said first connection hole, said first cavity, said second connection hole and said second gap, said second annular chamber being interposed along said longitudinal axis between said first chamber and said second gap, and being arranged more internally than said second connection hole, so that said low-pressure circuit completely surrounding said second annular chamber to intercept leakages of said first non-used paint.

8. A rotating joint as defined in claim 1, and further comprising at least one second high-pressure circuit for distributing at least one second paint to at least one second spraying gun, comprising a respective duct for said at least one second paint housed inside said shaft.

9. A rotating joint as defined in claim 8, wherein said drum comprises at least one second intermediate flange and one second annular chamber, in communication with said first duct for said at least one second paint, and a second entrance opening, suitable for receiving said at least one second paint, which is in communication with said second annular chamber, said at least one second intermediate flange being interposed between said first intermediate flange and said second end flange, coaxial with said axis and in contact with said first intermediate flange.

10. A rotating joint as defined in claim 9, wherein said second high-pressure circuit further comprises said second annular chamber and said first duct to distribute said at least one paint from said second opening to said at least one second spraying gun, said at least one second intermediate flange contains a second connection hole parallel to said axis.

11. A rotating joint as defined in claim 10, wherein said first intermediate flange and said second intermediate flange define a first intermediate cavity within said drum, said first intermediate cavity being in communication with said first connection hole and with said second connection hole.

12. A rotating joint as defined in claim 11, wherein said low-pressure circuit further comprises said first intermediate cavity and gap, said first connection hole, a second intermediate cavity, said hole, said second connection hole and said second gap to distribute said refrigerating/cleaning liquid from said entrance opening of said first end flange to said discharge opening of said second end flange, said second annular chamber being interposed along said longitudinal axis between said first annular chamber and said second gap, and being arranged more internally than said second connection hole, so that said low-pressure circuit completely surrounding said second annular chamber to intercept leakages of said paints.

13. A rotating joint as defined in claim 7, further comprising a plurality of high-pressure circuits for distributing respective paints to at least one respective spraying gun, each high-pressure circuit comprising respective first ducts for distributing respective paints housed inside said hollow shaft.

14. A rotating joint as defined in claim 13, wherein said drum comprises a plurality of intermediate flanges, said intermediate flanges being arranged in pairs to distribute each paint with recirculation, said intermediate flanges each comprising a respective annular chamber in communication with a respective duct to receive said paint, said intermediate flanges being arranged between said first end flange and second end flange, and wherein said drum comprises annular cavities contained in adjacent intermediate flanges, said first gap and said second gap being defined between one of respective intermediate adjacent flanges, or between and an intermediate flange adjacent to an end flange.

15. A rotating joint as defined in claim 7, and further comprising a plurality of hollow centering rings, said first gap, said second gap and said intermediate cavity each being arranged inside one of said centering rings, said centering rings each being housed in a respective seat that is between one of adjacent intermediate flanges and an adjacent intermediate flange and end flange.

16. A rotating joint as defined in claim 1, and further comprising a hole contained in said end flange communicating with a seat housing a bearing allowing the discharge of paint mixed with refrigerating/cleaning liquid on the surface of said joint.

17. A method for painting articles with a painting machine comprising a rotating joint as defined in claim 2, comprising the steps of:
(a) withdrawing at least one paint from a respective supplying tank and distributing the paint to said rotating joint through at least one pneumatic pump to at least one spraying gun;
(b) circulating said at least one paint inside a high-pressure circuit; and
(c) surrounding said high-pressure circuit with a low-pressure circuit, for circulating refrigerating/cleaning liquid.

18. A method for painting articles as defined in claim 17, wherein said at least one paint is recirculated, distributing said at least one unused paint from at least one spraying gun to a respective supplying tank.

19. A method for painting articles as defined in claim 17, wherein cloudiness of said refrigerating/cleaning liquid is detectable in its tank allowing for planned downtime for one of replacing and cleaning said rotating joint.

* * * * *